United States Patent

[11] 3,572,970

| [72] | Inventor | Robert J. Smuland<br>Cincinnati, Ohio |
|---|---|---|
| [21] | Appl. No. | 793,322 |
| [22] | Filed | Jan. 23, 1969 |
| [45] | Patented | Mar. 30, 1971 |
| [73] | Assignee | General Electric Company |

[54] TURBOMACHINERY BLADE SPACER
5 Claims, 6 Drawing Figs.

[52] U.S. Cl. .................................................. 416/221
[51] Int. Cl. .................................................. F01d 5/32
[50] Field of Search .......................................... 253/77
(CK), 77 (PM); 416/221

[56] References Cited
UNITED STATES PATENTS

| 952,317 | 3/1910 | Eyermann | 416/221 |
| 1,619,133 | 3/1927 | Kasley | 416/220 |
| 2,656,146 | 10/1953 | Sollinger | 416/220 |
| 2,753,149 | 7/1956 | Kurti | 416/221 |
| 3,395,891 | 8/1968 | Burge et al | 416/220 |

FOREIGN PATENTS

| 312,864 | 11/1933 | Italy | 416/220 |

*Primary Examiner*—Everette A. Powell, Jr
*Attorneys*—Derek P. Lawrence, Erwin F. Berrier, Jr, Lee H. Sachs, Frank L. Neuhauser and Oscar B. Waddell ABSTRACT: A blade spacer having a shank portion formed of a resilient, low-set, nonmetallic material and adapted for insertion beneath a turbomachinery blade so as to maintain the blade in tight radial abutment with its disc slot.

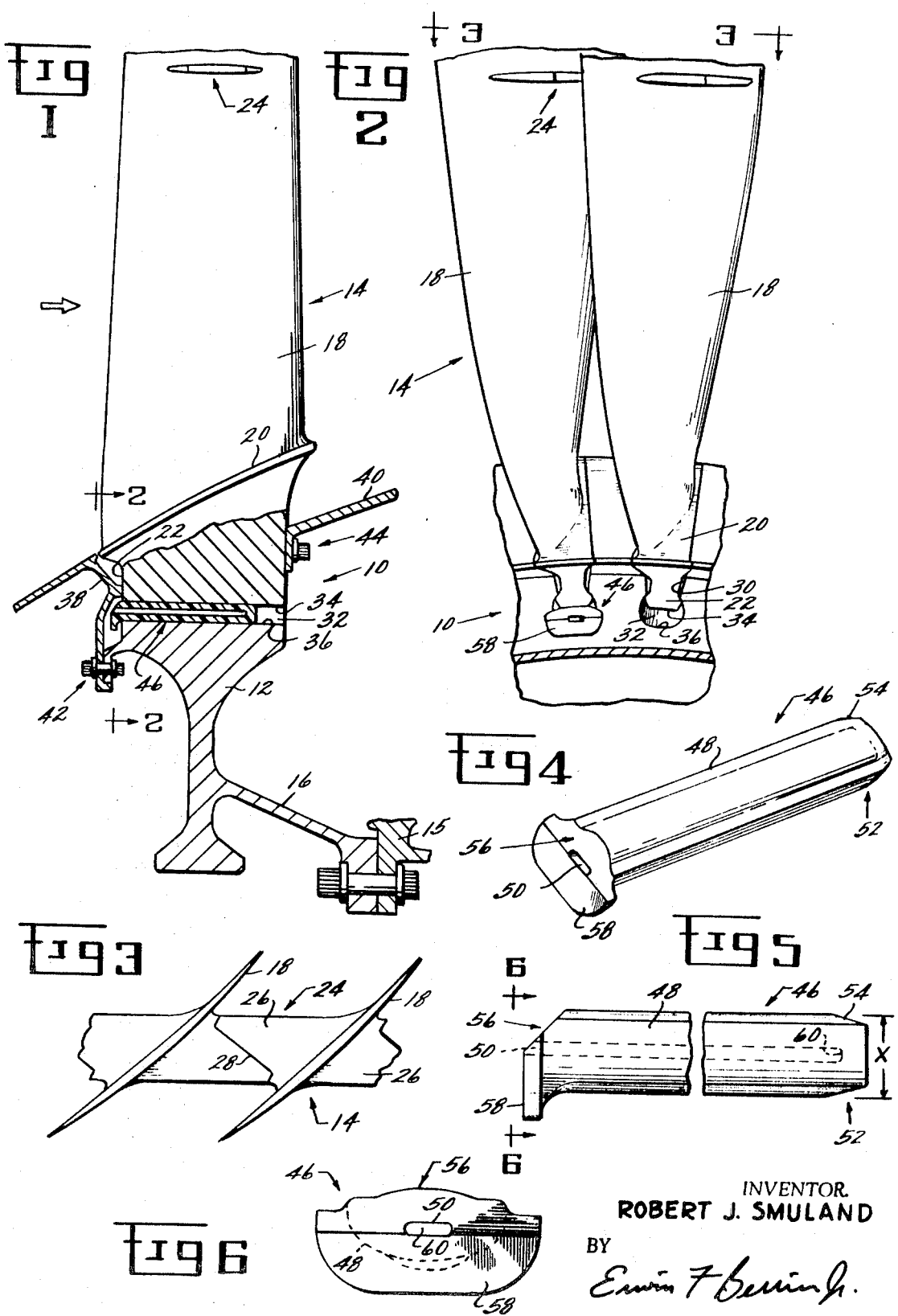

TURBOMACHINERY BLADE SPACER

This invention relates to turbomachinery and, more particularly, to means for holding a turbomachinery blade radially tight within a supporting rotor disc slot.

Turbomachinery blades are commonly secured to their supporting rotor disc within a slot adapted to lock the blade against radial movement. Where the blades are large, as for example in the case of high bypass fans, interlocking blade shrouds are generally employed to prevent excessive blade deflection and to damp vibration. To facilitate removal and replacement of one such shrouded blade from a fully assembled rotor disc, it may be necessary to radially oversize each slot so that a blade may be moved radially a sufficient distance to clear adjacent blade shrouds.

Where such radially oversized slots are utilized, it becomes necessary to provide means to hold each blade radially tight within its respective slot to facilitate balancing of the rotor and to prevent hammering and relative motion between abutting blade and disc surfaces which may increase wear.

While numerous prior art blade spacing devices have been proposed, such devices are usually complex and expensive in nature and are formed of a metallic material which may cause galling during operation or damage the blade and slot surfaces during installation or teardown. Moreover, such prior art devices are often suitable for use only in a closely toleranced passage, do not provide satisfactory positive radial support to the blade after prolonged use and often provide support only in a limited area which tends to concentrate wear.

A primary object of this invention, therefore, is to provide an economical turbomachinery blade spacer of simplified construction which overcomes the above problems.

Briefly stated, this invention provides an elongated shank of resilient, low-set material which has a cross-sectional shape generally conforming to the shape of the passage between the blade and slot base surface. The radial thickness of the shank is oversized relative to the radial height of the passage so that, after insertion into the passage, a radially outwardly directed force is exerted against the blade root base surface sufficient to maintain the blade in radial locking abutment with its rotor disc slot. Means are provided to axially position the shank within the passage as well as means to facilitate insertion and removal of the shank.

While the specification concludes with claims particularly pointing out and distinctly claiming the subject matter of this invention, it is believed the invention will be better understood from the following description of the preferred embodiment taken in connection with the accompanying drawing wherein:

FIG. 1 is a fragmentary cross-sectional view of an exemplary fan rotor disc employing the blade spacer of this invention;

FIG. 2 is a cross-sectional view taken along lines 2–2 of FIG. 1;

FIG. 3 is a fragmentary view taken along lines 3–3 of FIG. 2;

FIG. 4 is a perspective view of the blade spacer of FIG. 1;

FIG. 5 is a side elevational view, drawn on an enlarged scale, of the blade spacer of FIG. 4; and FIG. 6 is a view taken along line 6–6 of FIG. 5.

Referring now to FIG. 1, the fan portion of a turbofan engine has been shown generally at 10 as comprising an annular disc member 12 supporting at its periphery a plurality of radially extending fan blades 14. The disc 12 is suitably connected to, and for rotation with, a shaft 15 through a stub shaft 16.

As best shown in FIGS. 1, 2 and 3, each blade 14 is formed with an airfoil portion 18, a platform portion 20, a root portion 22, and shroud means 24. The shroud means 24 have been shown as comprising a circumferentially extending sector 26 formed with a generally S- or Z-shaped radial edge 28 which abuts and interlocks with the adjacent radial edge 28 of each preceding and succeeding blade shroud.

The fan disc 12 is formed at its periphery with a plurality of circumferentially spaced, generally axially extending slots 30, each of which is adapted to axially receive the root portion 22 of a blade 14. As best shown in FIG. 2, the slots 30 and blade root portions 22 are cooperatively formed to abut and radially lock the blade against centrifugal force. While the blade root portions 22 and slots 30 have been shown as being of a dovetail configuration, it should be understood that other configurations such as a fir tree or the like may be employed.

As will be understood, to install, remove or replace a single blade of the interlock shroud type shown, it is necessary to form the slots 30 radially oversized so that with the blade in radial locking abutment as shown in FIG. 2, a passage 32, having a radial height greater than the radial thickness of the shroud sectors 26, is formed between the base surface 34 of the blade root 22 and the base surface 36 of the slot. With such an oversized slot, an installed blade may be conveniently removed from a fully assembled fan disc by dropping the blade radially inwardly until adjacent shroud sectors have disengaged and then sliding the blade axially out of its slot. Initial blade installation or replacement may be readily accomplished by reversing the above procedure.

Once installed within the disc slots 30, the blades 14 may be axially locked against fore and aft movement by suitable hub members such as at 38 and 40 which may be suitably fastened to the disc 12 as at 42 and 44, respectively.

In order to maintain each blade 14 in radial locking abutment with its respective slot 30 so as to facilitate balancing of the fully assembled disc 12 and prevent galling and fretting during rotation of the fan, the blade spacer 46 of this invention is provided. As best shown in FIGS. 4, 5 and 6, the blade spacer 46 is formed with a generally solid shank portion 48 having an axial cross section generally conforming to the axial cross section of the passage 32. The shank portion 48 is formed with a generally centrally disposed well 50 (the function of which will be hereinafter described) which preferably does not extend completely through the shank portion 48.

The radial thickness X in FIG. 5 of the spacer shank portion 48 is oversized relative to the radial height of the passage 32 by a predetermined amount so that when the spacer 46 is inserted into the passage 32, as shown in FIG 1, it will be radially compressed between blade and disc surfaces 34 and 36. Such compression is operative to yieldingly urge the blade 14 radially outwardly into abutment with its slot 30 with a predetermined force. The amount of radial oversize, as will be understood, will vary depending upon the weight of each blade 14, the radial height of the passage 32 and the properties of the material from which the spacer 46 is formed. By way of example, however, it has been found that with a blade 14 weighting approximately 10 lbs. and a passage 32 having a radial height of approximately ½ inch, an oversize of approximately one-tenth inch provides satisfactory results.

The spacer 46 is preferably a molding formed of a resilient, nonmetallic, low-set material. For example, several commercially available polyurethane compounds have been satisfactorily employed. While one such material has a maximum set in the order of 3 percent, materials having a somewhat higher maximum set may be used.

In order to facilitate insertion of spacer 46, the spacer material preferably has a low coefficient of friction or, alternatively, the exterior surfaces of the shank portion 48 may be lubricated or provided with a thin film of low-friction material such as polytetrafluoroethylene. As a further aid to insertion of the spacer, the leading end 52 may be tapered as at 54.

Positive stop means may be provided to automatically locate the spacer 46 at the proper axial position within the passage 32. For example, the trailing end 56 of the shank 48 may be formed with an integral lip 58 adapted to abut the disc 12.

The use, operation and function of the blade spacer of this invention are as follows:

With the fan blade 14 positioned within its respective slot 30 as in FIGS. 1 and 2, the spacer 46 may be conveniently inserted into the passage 32 by inserting a suitable insertion tool or push rod (not shown( ) into the well 50 until it bottoms against the end surface 60 of the well. The end surface 60 of the well 50 is preferably located near shank end 52 so that when the insertion tool is forced against well bottom 60 tensile stresses are developed within the shank which cause slight elongation of the shank and a reduction in the radial thickness dimension X. This effect, coupled with the taper 54 and the low friction exterior surface of the shank portion 48, enables the spacer to be easily inserted within its passage 32. By providing stop means such as the lip 58, proper axial positioning of the spacer 46 within the passage 32 is automatically established when the lip abuts the disc 12 as in FIG. 1. Additionally, as will be noted hereinafter, the lip 58 operates as an aid in the extraction of the spacer.

When the push rod or insertion tool is removed from the well 50, the shank portion 48 attempts to return to its original shape causing a radially outwardly directed force to be exerted against the base surface 34 of the blade root thereby urging the blade into radial locking abutment with the wall surfaces of the slot 30.

By utilizing a resilient, low-set material, and properly selecting the radial thickness X of the shank portion 48, the spacer 46 may be used in passages 32 having a wide variation in radial height as would generally be experienced in large diameter turbofan engines, thereby eliminating the need for close tolerancing of parts or shimming.

In large diameter turbofans, it is desirable, particularly where titanium alloys are used for the disc and/or the blade, to provide antifret coatings up to or even greater than 0.02 inches in thickness on the abutting surfaces of the blade and disc slot. While the spacer of this invention will considerably reduce fretting or erosion of such coatings, with prolonged use there will be some erosion which will tend to increase the radial height of the passage 32. Notwithstanding such wear, the blade spacer 46 of this invention will, by properly selecting the radial thickness X of the shank portion 48, continue to provide a sufficient force against the base surface 34 of the blade root to maintain the blade in tight radial locking abutment with its respective slot 30, thereby preventing the significant wear and galling which would otherwise be experienced when, for example, the centrifugal force due to fan rotation is not adequate to keep the blades radially tight.

By forming the shank 48 with an axial cross section generally conforming to the axial cross section of the passage 32, supporting abutment is established over substantially the entire circumferential width of the blade base surface 34, as shown in FIG. 2, thereby discouraging rocking motion of the blade.

The spacer 46 and hence the blades 14 may be removed by pulling on the lip 58 and, in some instances, retensioning the shank portion 48 with the insertion tool. With the spacer thus removed, the blade 14 may be dropped radially inwardly until its shroud sectors 26 clear the adjacent shroud sectors and axially removed from its slot.

By forming the shank of a resilient, nonmetallic material, scratching or scoring of the disc or blade root portion, which might seriously impair the life or either part, will not occur during assembly or disassembly of the spacer 46. Additionally, fretting due to any slight relative movement between the spacer and either the blade or the disc will be greatly reduced.

From the above, it will be appreciated that the blade spacer of this invention provides relatively simple and economical means for maintaining a turbomachinery blade radially tight against its disc slot so as to reduce galling and fretting even though the slot is subject to wide tolerance variations or enlargement after prolonged use.

While the foregoing is a description of the preferred embodiment of this invention, it should be understood that many modifications, alterations, and variations may be made without departing from the invention's fundamental theme. Although the invention has been depicted and described in connection with the fan portion of a turbofan engine, it will be appreciated that this invention may be effectively employed in numerous other turbomachinery applications.

I claim:

1. For use in turbomachinery of the type including a rotatable disc formed with at least one slot at its periphery, a blade having a root portion engaged in said slot and extending generally radially from said disc, said slot and said root portion sized and formed to abut and radially lock the blade to the disc, with the base surface of the root portion spaced from the base surface of the slot to form a passage therebetween, means for maintaining said blade in said radial locking abutment with said disc comprising, an elongated shank having a cross-sectional shape generally conforming to the cross-sectional shape of said passage, the radial thickness of said shank being of predetermined increased dimension with respect to the radial height of said passage, said shank being formed of a resilient, nonmetallic, low-set material whereby said shank may be elongated for insertion into and removal from said passage and is compressed after insertion to yieldingly urge said blade outwardly into said locking abutment with said disc.

2. The structure of claim 1 further characterized in that said shank is formed with an axially extending well opening at one end of said shank, said well terminating at a position closely spaced to the other end of said shank, whereby said elongation may be effected by applying an axially directed force to the terminal end of said well.

3. The structure of claim 1 further characterized in that one end of said shank is tapered to facilitate insertion of said shank in said passage.

4. The structure of claim 1 further characterized by and including stop means for axially positioning said shank within said passage.

5. The structure of claim 4 further characterized in that said stop means comprises a lip adapted for abutment with said disc and integrally formed with and at one end of said shank.